(12) United States Patent
Canard et al.

(10) Patent No.: US 8,607,332 B2
(45) Date of Patent: Dec. 10, 2013

(54) SYSTEM AND METHOD FOR THE ANONYMISATION OF SENSITIVE PERSONAL DATA AND METHOD OF OBTAINING SUCH DATA

(75) Inventors: Sébastien Canard, Caen (FR); Stéphane Guilloteau, Douville en Auge (FR); François Boudet, Fierville (FR)

(73) Assignee: France Telecom, Paris (FR)

( * ) Notice: Subject to any disclaimer, the term of this patent is extended or adjusted under 35 U.S.C. 154(b) by 897 days.

(21) Appl. No.: 11/883,267

(22) PCT Filed: Jan. 26, 2006

(86) PCT No.: PCT/FR2006/050060
§ 371 (c)(1),
(2), (4) Date: Jul. 26, 2007

(87) PCT Pub. No.: WO2006/079752
PCT Pub. Date: Aug. 3, 2006

(65) Prior Publication Data
US 2008/0304663 A1  Dec. 11, 2008

(30) Foreign Application Priority Data
Jan. 26, 2005  (FR) ...................................... 05 00784

(51) Int. Cl.
*G06F 17/30* (2006.01)
*H04L 9/22* (2006.01)
(52) U.S. Cl.
USPC .............................. 726/20; 713/165; 713/166
(58) Field of Classification Search
None
See application file for complete search history.

(56) References Cited

U.S. PATENT DOCUMENTS

| 5,606,610 | A | 2/1997 | Johansson et al. | |
|---|---|---|---|---|
| 5,778,071 | A | 7/1998 | Caputo et al. | |
| 6,353,888 | B1* | 3/2002 | Kakehi et al. | 713/168 |
| 6,789,195 | B1* | 9/2004 | Prihoda et al. | 713/182 |
| 6,874,085 | B1* | 3/2005 | Koo et al. | 713/165 |
| 2003/0097559 | A1* | 5/2003 | Shimizu et al. | 713/155 |
| 2003/0097571 | A1* | 5/2003 | Hamilton et al. | 713/182 |
| 2003/0208457 | A1 | 11/2003 | Iyengar | |
| 2004/0215981 | A1* | 10/2004 | Ricciardi et al. | 713/202 |
| 2005/0165623 | A1* | 7/2005 | Landi et al. | 705/2 |
| 2005/0283620 | A1* | 12/2005 | Khulusi et al. | 713/185 |

FOREIGN PATENT DOCUMENTS

| EP | 0 884 670 A | 12/1998 |
|---|---|---|
| EP | 1 099 996 A | 5/2001 |
| FR | 2 837 301 | 9/2003 |
| WO | WO 01/18631 | 3/2001 |
| WO | WO 01/69514 | 9/2001 |

* cited by examiner

*Primary Examiner* — Venkat Perungavoor
(74) *Attorney, Agent, or Firm* — Cozen O'Connor

(57) ABSTRACT

A system for managing sensitive personal data includes a first data processing subsystem and a second data processing subsystem. The first data processing subsystem includes a generating unit and a private database. The generating unit generates a common key from data identifying a person. The private database associates the common key with the identification data. The second data processing subsystem includes an obtaining unit, a generating unit, a receiving unit and a storing unit. The obtaining unit obtains the common key. The generating unit generates a random number from the common key. The receiving unit receives a registration message including sensitive personal data of the person and the random number. The storing unit stores the personal data in a second database in association with the random number and the common key.

17 Claims, 2 Drawing Sheets

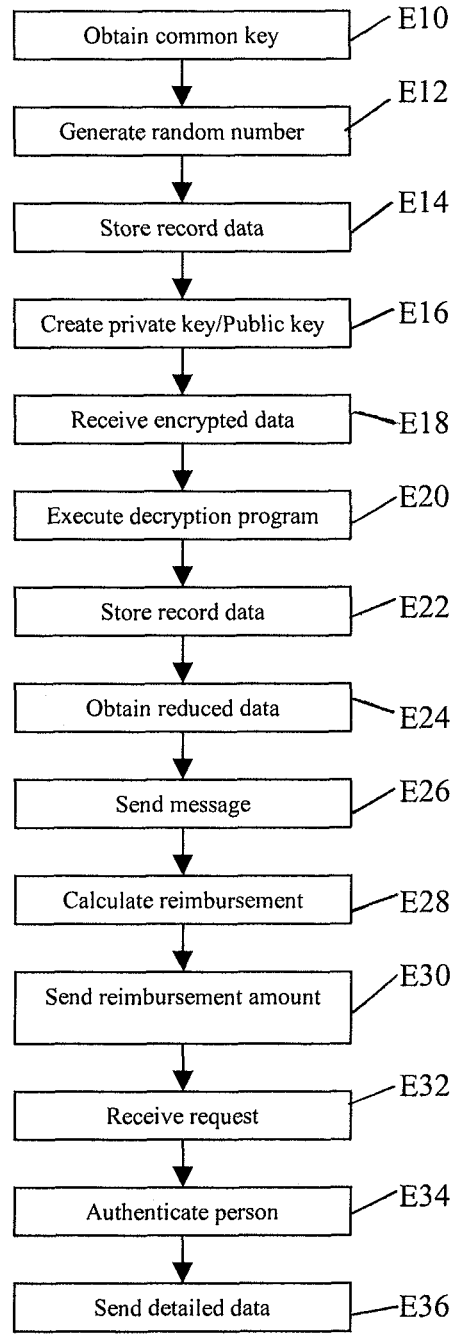
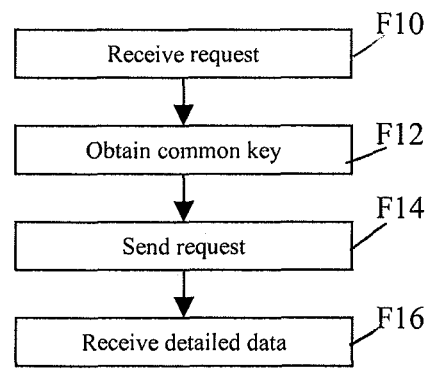
FIG. 3
FIG. 2

SYSTEM AND METHOD FOR THE ANONYMISATION OF SENSITIVE PERSONAL DATA AND METHOD OF OBTAINING SUCH DATA

RELATED APPLICATIONS

This is a U.S. National Stage of International Application No. PCT/FR2006/050060 filed on Jan. 26, 2006.

BACKGROUND OF THE INVENTION

The present invention relates to the general field of anonymizing data.

Although this is not limiting on the invention, a preferable use of the invention is in the healthcare field, for anonymizing a patient's medical records.

In this field, for a number of years, complementary insurers have sought to access healthcare data contained in electronic care sheets that are received at present only by compulsory insurers.

Clearly this touches on sensitive areas such as protection of individual liberties and medical confidentiality.

For a number of years microcircuit cards (smart cards) have been used in the healthcare field.

In France, for example, healthcare professionals (doctors, pharmacists, etc.) use a professional microcircuit card with identification, signature, and encryption functions for transferring electronic care sheets.

In France, an insured person's SESAME VITALE card is at present used only to identify insured persons to healthcare professionals and to record their entitlements. This card is welcomed by insured persons because it speeds up reimbursement.

However, a SESAME VITALE card does not enable complementary insurers to carry out electronic processing of detailed medical data, for example to perform statistical analyses covering the entire insured population.

The document EP 1 099 996 describes a system for managing sensitive medical data of a patient anonymously.

That system includes a first subsystem that associates data identifying each patient with an identifier (scrambled id) generated from the patient's identification data.

The system disclosed in EP 1 099 996 also includes a database that stores sensitive medical data for each patient, received from data providers, in association with the patient's identifier.

That system has a major drawback because the data provider, the first subsystem, and the database all share the same identifier.

Consequently, the system disclosed in EP 1 099 996 is not strictly speaking an anonymous system, since the first subsystem would be able to obtain all the sensitive medical data for an identified patient if it were to access said database (whether legitimately or fraudulently).

OBJECT AND SUMMARY OF THE INVENTION

The invention addresses the requirement of complementary insurers to be able to manage detailed medical service provision data at the same time as complying with strict rules regarding protection of privacy and medical confidentiality. The principle adopted is that of anonymizing patient medical data, i.e. sending detailed data from the healthcare professional to a third party in a form that does not name the patient. This principle is recommended in the Babusiaux report.

Thus a first aspect of the invention provides a system for managing sensitive personal data, including:
  a first data processing subsystem including:
    means for generating a common key from data identifying a person; and
    a private database that associates the common key with the identification data; and
  a second data processing subsystem including:
    means for obtaining the common key;
    means for generating a random number from the common key;
    means for receiving a registration message including at least sensitive personal data of the person and the random number; and
    means for storing the personal data in a second database in association with the random number and the common key.

This management system complies strictly with the anonymization constraint. The first subsystem holds the real identity of a person in the form of identification data but it does not hold the associated random number and does not store sensitive personal data for that person.

The second subsystem, which stores the person's sensitive data, cannot link that sensitive data to the person because it does not store the real identity of the person, only the common key shared with the first subsystem.

Consequently, even if the first subsystem were accidentally or dishonestly to obtain the registration message intended for the second subsystem, it would be incapable of identifying the patient to whom the sensitive data contained in the message belongs, because the first subsystem knows only the common key and not the random number.

In one particular embodiment of the invention, as described below, the random number enables a person holding a personal digital storage medium (for example a microcircuit card) on which the random number is stored to authenticate him or herself to the second subsystem.

In the field of healthcare, the first subsystem can be implemented by a complementary insurer or a non-profit health insurance company. It manages a person's contracts and payment for medical services but, under existing law, it is not allowed to access detailed data on services that the person may have received.

The second subsystem, which acts a service provider to the first subsystem, can carry out statistical processing of such detailed data but cannot link the data to a person.

As explained below, apart from the patient and the healthcare professional, it must not be possible for anyone to be able to access detailed data on a particular patient, i.e. both the patient's identity and the services received from the healthcare professional.

In a preferred embodiment, the second data processing subsystem includes:
  means for obtaining reduced data from the sensitive data; and
  means for sending the first data processing subsystem a message including the reduced data and the common key associated with the sensitive personal data in the second database.

In this embodiment, detailed sensitive data includes or is associated with reduced data that is not sensitive.

It can therefore be stored in the private database of the first subsystem.

The expressions "detailed data" and "reduced data" are well known in the healthcare field.

Reduced data can in particular be used by the first subsystem that manages patients' contracts. Detailed data can be associated with complementary data, for example the amount charged for a medical service.

To make transactions more secure, one particular embodiment of the personal data management system of the invention includes means for creating a private signature key/public signature key pair, the public signature key, included in a certificate, being stored in the second subsystem and the private signature key being stored in the patient's digital storage medium.

The second subsystem preferably includes means for creating a private encryption key/public encryption key pair. Thus when a patient's sensitive personal data must be passed to the second subsystem, it is first encrypted by that person's digital storage medium using the public encryption key.

On receiving the encrypted data from a reader of that storage medium, the second subsystem decrypts the data encrypted with the private encryption key previously stored to obtain the person's random number and sensitive personal data. It then stores this personal data in its second database in association with the random number.

In a preferred embodiment in which the personal digital storage medium of the patient is a microcircuit card, a card provider creates the private signature key/public signature key pair and a certificate linked to the public key and the common key referred to above.

Alternatively, this pair of keys is created by the digital storage medium itself, which sends the public key to the second subsystem to create the certificate. This method is even more secure as the private key never leaves the medium.

Be this as it may, the certificate, the private key, and the random number are written into a protected area of this storage medium.

The digital storage medium contains a signature algorithm and an encryption algorithm, both of which are preferably asymmetrical. This is known in the art. Where appropriate it includes a pseudo-random number generator.

A preferred embodiment of the sensitive data management system of the invention can also revoke the anonymity of particular sensitive personal data at the request of the person concerned.

To this end, the first subsystem includes means for receiving a request from a person to obtain particular sensitive personal data.

Of course, the first subsystem must not be able to obtain other sensitive data of this person from the second subsystem.

Consequently, the invention provides for the first subsystem to send the second subsystem a request for authentication of the person concerned, this request including an identifier of the particular sensitive personal data looked for and the common key generated from the identification data of the person.

In the context of a healthcare system, the identifier can be an invoice number linked to a particular service.

The second subsystem includes means for receiving the authentication request, means for authenticating the person, and means for sending the particular sensitive personal data required to the first subsystem if authentication is successful.

This particular feature may be used when there is a complaint from a person, for example.

The procedure for authentication as such of the person by the second subsystem is not part of the invention and is not described in detail here.

If the management system is used in the healthcare field, the second subsystem receives patients' sensitive personal data from the reader of the patient's digital storage medium, which is physically installed on the premises of the healthcare professional.

The sensitive data includes the amount charged for the service concerned.

In this embodiment, the second subsystem preferably includes means for calculating a reimbursement amount from the amount charged for the service and the patient's entitlements stored in the second database.

The second subsystem includes means for sending this reimbursement amount to the reader (for the attention of the healthcare professional) or to the first data processing subsystem.

The invention also consists in a method of managing sensitive personal data that can be used by the second data processing subsystem of the above management system, including:
    a step of obtaining a common key;
    a step of generating a random number from the common key;
    a step of receiving a registration message including sensitive personal data of the person and the random number; and
    a step of storing the sensitive personal data in a second database of said second data processing subsystem in association with the random number and the common key.

The invention further consists in a method of obtaining sensitive personal data that can be used in a first subsystem of the above system, including:
    a step of receiving a request for obtaining particular sensitive personal data of a person; and
    a step of sending a second electronic data processing subsystem of the above system a request for authentication of the person, the authentication request including an identifier of the particular sensitive personal data and a common key generated from data identifying the person;
    a step of receiving the particular sensitive personal data from the second subsystem if the authentication is successful.

The particular advantages of the management method and the method of the invention for obtaining sensitive personal data are identical to those of the personal data management system referred to above and are not repeated here.

In a preferred embodiment, the various steps of the management method and/or the method of obtaining sensitive personal data are determined by computer program instructions.

Consequently, the invention also consists in a computer program on an information medium, which can be executed by a first subsystem of the above system, the program including instructions for executing the above method of managing sensitive personal data.

The invention further consists in a computer program on an information medium, which can be executed by a first subsystem of the above system, the program including instructions for executing the above method of obtaining sensitive personal data.

The above programs can use any programming language and take the form of source code, object code or an intermediate code between source code and object code, such as a partially compiled form, or any other desirable form.

The invention further consists in an information medium readable by a second subsystem of the above system, characterized in that it includes instructions of the above computer program.

The invention further consists in an information medium readable by a first subsystem of the above system, characterized in that it includes instructions of the above computer program.

The above information medium can be any entity or device capable of storing the program. For example, the medium can include storage means such as a ROM, for example a CD ROM or a microelectronic circuit ROM, or a magnetic storage medium, for example a diskette (floppy disk) or a hard disk.

Moreover, the information medium can consist of a transmissible medium such as an electrical or optical signal, which can be routed via an electrical or optical cable, by radio or by other means. The program according to the invention can in particular be downloaded over a network, and in particular over an Internet type network.

Alternatively, the information storage media can consist of an integrated circuit into which the program is incorporated, the circuit being adapted to execute the method in question or to be used in its execution.

BRIEF DESCRIPTION OF THE DRAWINGS

Other features and advantages of the present invention emerge from the following description with reference to the appended drawings, which show one non-limiting embodiment thereof. In the figures:

FIG. 2 is a flowchart that represents the main steps of a preferred embodiment of a method of the invention for managing sensitive personal data; and FIG. 3 is a flowchart that represents the main steps of a preferred embodiment of a method of the invention for obtaining sensitive personal data.

DETAILED DESCRIPTION OF THE DRAWINGS

Figure 1:
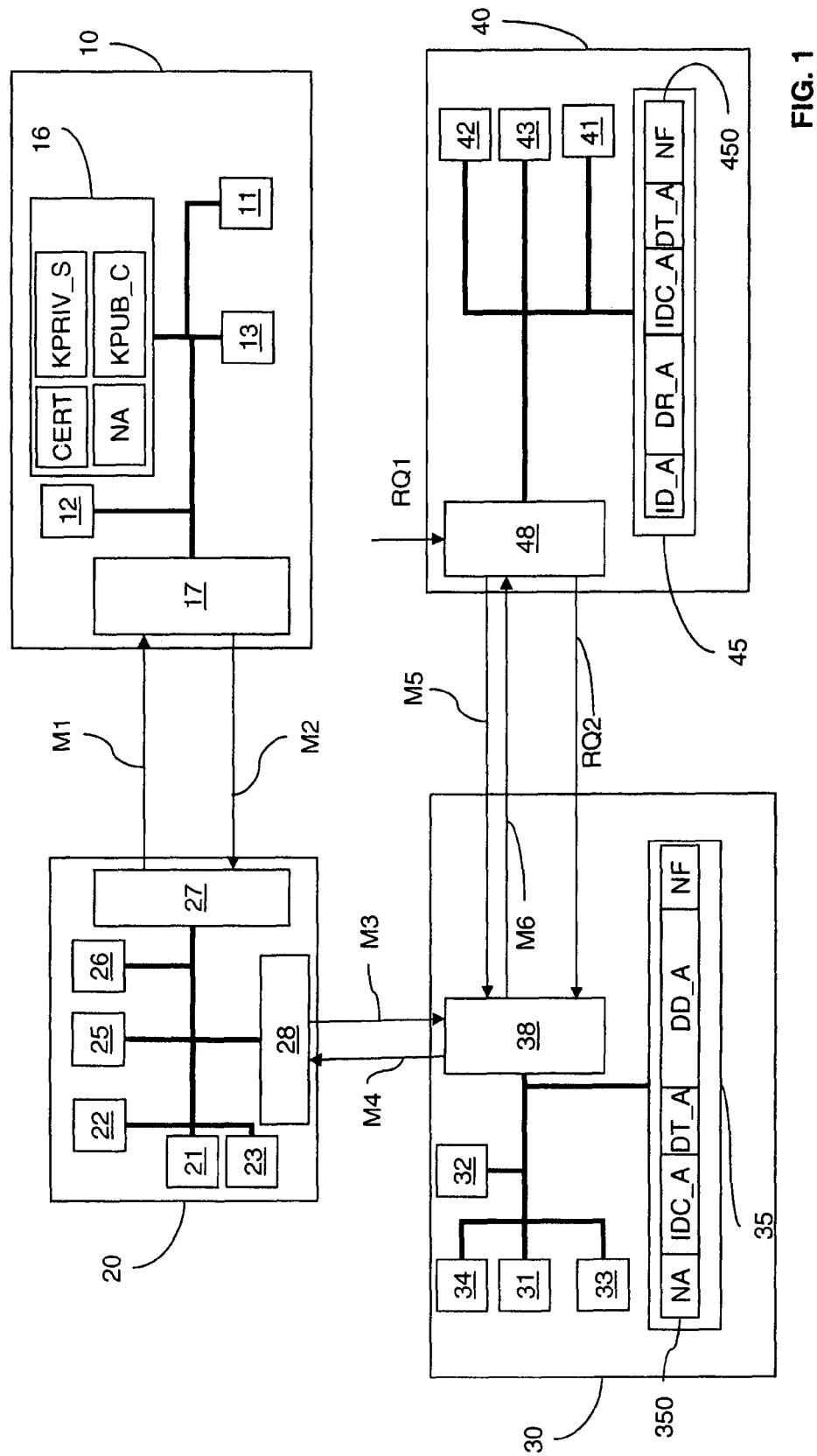
FIG. 1 is a diagram that represents a preferred embodiment of a personal data management system of the invention.

The following description is given in the context of anonymizing personal data in the healthcare field.

In this example, each insured patient has a personal digital storage medium consisting of a microcircuit card 10. This digital storage medium can instead consist of a USB key, a mobile telephone or any other electronic device including a secure storage space and cryptographic authentication, signature and encryption means.

In the FIG. 1 system, there are shown a microcircuit card 10 belonging to an insured person A, a reader 20 belonging to a healthcare professional and able to read that microcircuit card, a first subsystem 40 that contains personal data of insured persons and can be used to obtain particular detailed data at the request of the insured person, and a second subsystem 30 adapted to receive encrypted sensitive personal medical data of the insured person A from the reader 20 and to store that data anonymously.

In this embodiment a healthcare professional generates sensitive personal data for any medical service provided to a patient A consisting of detailed medical data DD_A and complementary data including an amount MP charged for the service.

The detailed medical data DD_A is associated with reduced medical data DR_A.

The reduced medical data DR_A can constitute a subset of the detailed medical data DD_A, for example. In one embodiment, the second subsystem includes a correspondence table enabling it to derive the reduced data DR_A from the detailed data DD_A.

For example, the reduced data for a service consists of the name of a group of medications and the detailed data consists of that name (reduced data) and sensitive personal information (the name of the particular medication in the group).

Each patient A is identified by personal identification data ID_A consisting, for example, of the person's name, address, and social security number.

The identification data ID_A is stored in a private database 45 of the first subsystem 40.

The first subsystem 40 includes a processor 41, a read-only memory (ROM) 42 that contains computer programs that can be executed by the processor 41, and a random-access memory (RAM) 43 needed to execute these programs.

The read-only memory 42 contains in particular a program for generating a key IDC_A from identification data ID_A of a person A.

This key is shared by the second subsystem 30 and is referred to as the "common key IDC_A".

For each subscriber A to the management system of the invention, the database 45 of the first subsystem 40 includes a record 450 that associates the common key IDC_A generated in this way with identification data ID_A identifying that person.

The second subsystem 30 likewise includes a processor 31, a read-only memory 32 containing computer programs that can be executed by the processor 31, and a random-access memory 33 needed to execute these programs.

The read-only memory 32 contains in particular a computer program adapted to execute the personal data management method represented in the FIG. 2 flowchart.

That method includes a first step E10 in which the second subsystem 30 obtains the common key IDC_A generated by the first subsystem 40 for a person A whose identity it does not know.

In the preferred embodiment described here, each insured person A has particular entitlements DT_A negotiated with that person's insurer and stored in the record 450 in the private database 45 of the first subsystem 1. These entitlements DT_A are also obtained by the second subsystem 30 during the step E10 mentioned above of obtaining the common key.

In the preferred embodiment described here, the step E10 of the data management method is followed by a step E12 in which the second subsystem 30 generates a random number NA from the common key IDC_A received in the preceding step.

In a preferred embodiment, the common key IDC_A and the random number NA are generated by AES type symmetrical encryption. More precisely, the program of the first subsystem 40 for generating the common key IDC_A holds a secret key $AES_{K1}$ and the program of the second subsystem 30 for generating a random number holds a secret key $AES_{K2}$, the identifiers being calculated as follows:

$IDC\_A = AES_{K1}(ID\_A)$; and $NA = AES_{K2}(IDC\_A)$.

This step E12 is followed by a step E14 in which the random number NA, the common key IDC_A and the entitlements DT_A of a person whose identity is unknown to the second subsystem 30 are stored in a record 350 in a database 35 of the second subsystem 30.

As explained below, this record 350 includes a field, initially empty, in which the second subsystem 30 stores sensitive personal data DD_A of this person.

The sensitive data DD_A is therefore anonymous, in the sense that the second subsystem 30 does not have access to the data ID_A identifying this person.

In the preferred embodiment described here, the first subsystem 40 and the second subsystem 30 include respective communication means 38 and 48 for connecting these subsystems via a network, for example via the Internet. These communication means consist of network cards and software layers known to the person skilled in the art.

In particular the second subsystem 30 uses these communication means to obtain the common key IDC_A from the first subsystem 40.

Assume now that the random number NA generated by the second subsystem 30, the common key IDC_A generated by the first subsystem 40, and the data ID_A identifying the person A are sent to a card provider to create a personal microcircuit card 10 for the person A.

In the embodiment described here, in a step E16 of the data management method of the invention, on receiving this information the card provider creates a private signature key/public signature key pair KPRIV_S/KPUB_S and a certificate CERT containing the public signature key KPUB_S and the identifier IDC_A.

Using the common identification key IDC_A and the certificate CERT, the card provider can retrieve all the data for a person A, in particular personal data ID_A, the random number NA, and the private signature key KPRIV_S. All this is known to the person skilled in the art.

In this preferred embodiment, the second subsystem creates a private/public encryption key pair KPRIV_C/KPUB_C. In the same step, the private encryption key KPRIV_C is stored in a memory area 34 of the second subsystem 30. The public encryption key KPUB_C is supplied to the card provider.

The certificate CERT, the private signature key KPRIV_S associated with that certificate, the random number NA, and the public encryption key KPUB_C are stored in a protected area 16 of the microcircuit card 10.

The microcircuit card 10 includes a processor 11, a read-only memory 12 containing programs that can be executed by the processor 11, and a random-access memory 13 needed for the execution of these programs.

A medical service is described next. It is assumed that the person A consults a healthcare professional equipped with a reader 20 adapted to read their microcircuit card 10.

The reader 20 includes a processor 21, a read-only memory 22 containing programs that can be executed by the processor 21, and a random-access memory 23 needed to execute these programs.

The reader 20 also includes communication means 27 adapted to communicate with communication means 17 of the microcircuit card 10 in read mode and in write mode.

The microcircuit card reader 20 also includes means 28 for communicating with the communication means 38 of the second subsystem 30.

In the preferred embodiment described here, the communication means 28 of the reader 20, the communication means 38 of the second subsystem 30, and the communication means 48 of the first subsystem 40 enable these three units to communicate via a network that is not shown in FIG. 1 (for example the Internet).

The healthcare service described here generates detailed medical data DD_A to which there corresponds reduced data DR_A. An amount MP is charged for the medical service.

In the preferred embodiment described here, the reader 20 includes a keyboard 25 for entering the detailed data DD_A and a screen 26 for monitoring that input.

When the detailed medical data DD_A is entered by the healthcare professional, this data and the amount MP charged for the service are sent to the microcircuit card 10 of the patient A in a message M1.

All this data is received by the communication means 17 of the microcircuit card 10, and its processor 11 then executes a signature and encryption program stored in the read-only memory 12.

More precisely, in the example described here, these encryption and signature programs use the RSA-PKCS algorithm in the following manner.

First of all, using the private signature key KPRIV_S and the certificate CERT, this program generates a signature S for the detailed personal data DD_A and complementary data including the amount MP.

This signature S includes the detailed personal data DD_A of the patient and the amount MP charged for the service.

Then, using the public encryption key KPUB_C, the program encrypts the signature S, the random number NA, and the certificate CERT to obtain encrypted data DC.

The encrypted data DC is read by the reader 20 (stream M2 in FIG. 1) and then sent to the second subsystem 30 in a registration message M3.

The communication means 38 of the second subsystem 30 receive the encrypted data DC during a step E18 of the data management method of the invention.

That step E18 is followed by a step E20 in which the processor 31 of the second subsystem 30 executes a program stored in the read-only memory 32 for decrypting the data DC.

To perform this decryption, the aforementioned program uses the private decryption key KPRIV_C that was stored in the memory 34 during the step E16 described above.

This decryption step E20 enables the second subsystem 30 to recover the random number NA that was used to encryption, the detailed data DD_A for the service included in the signature S, and complementary data, for example the amount MP charged for the service.

During this step E20, the second subsystem 30 verifies the signature S using the public signature key KPUB_S.

This decryption step E20 is followed by a step E22 in which the second subsystem 30 stores the personal medical data DD_A, including the random number NA included in the encrypted data DC, in the field of the record 350 in the database 35 that is still free.

In the preferred embodiment described here, this storage step E22 is followed by a step E24 during which the second subsystem 30 executes a program stored in its memory 32 to obtain the reduced data DR_A, here consisting of the name of a group of medications, from the detailed data DD_A. It also generates an invoice number NF.

This step E24 is followed by a step E26 in which the second subsystem 30 sends the first subsystem 40 a message M6 including the reduced data DR_A, the invoice number NF, where appropriate complementary data such as the amount MP charged for the service, and the common key IDC_A stored in the aforementioned record 350.

Thus, on receiving this message M6, the first subsystem 40 can store the reduced data DR_A in the record in its database 45 containing the common key IDC_A.

The invoice number NF is stored in a field of the record 450 of the database 45 of the subsystem 1.

The principle of anonymity is complied with since the detailed data DD_A is known only to the second subsystem 30, which does not have access to the identification data ID_A stored in the private database 45 of the first subsystem 40.

In a preferred embodiment, the read-only memory 32 of the second subsystem 30 contains a program for carrying out statistical processing of the sensitive data DD_A stored in the second database 35.

In the preferred embodiment described here, the step E26 of sending the message M6 is followed by a step E28 in which the second subsystem 30 calculates a reimbursement amount MR from the entitlements DT_A stored in the database 35 in the record containing the common key IDC_A and the amount MP charged for the service received in the encrypted data DC.

In a subsequent step E30 the reimbursement amount MR is sent to the reader 20 of the healthcare professional and to the first subsystem 40 via the network.

The first subsystem 40 supplies the patient with the invoice number NF, the reimbursement amount MR and information relating to the service, for example by mail.

On receiving this reimbursement amount, the healthcare professional knows how much remains to be settled by the patient A.

Assume now that the patient A wishes to complain about the invoice carrying the number NF.

To this end, the patient wishes to obtain the detailed data DD_A relating to this invoice stored in the database 35 of the second subsystem 30.

To make it possible for the patient to obtain this data, the read-memory 42 of the first subsystem 40 includes a computer program that implements a method in accordance with the invention for obtaining personal data. The main steps of that method are described next with reference to FIG. 3.

This method of obtaining personal data includes a first step F10 in which the first subsystem 40 receives from the patient A a request RQ1 for the sensitive personal data DD_A associated with the invoice NF.

This step F10 is followed by a step F12 in which the first subsystem 40 obtains from the database 45 the common key IDC_A generated from the data ID_A identifying the person A.

This step F12 is followed by a step F14 in which the first subsystem 40 sends the second subsystem 30 a request RQ2 to authenticate the person A.

This authentication request RQ2 includes the identifier NF of the invoice and the common key IDC_A obtained in the preceding step.

In the preferred embodiment described here, this request RQ2 is received during a step E32 of the data management method.

The person skilled in the art will understand that this request RQ2 is preferably received and managed as part of a process that is different from the process of storing the data as such.

Be this as it may, this step E32 of receiving the request RQ2 is followed by a step E34 in which the second subsystem 30 seeks to authenticate the person A.

Various authentication methods may be used, the only constraint being that the authentication as such must be carried out by the second subsystem 30 to prevent the first subsystem 40 using the request RQ1 to obtain data other than that associated with the invoice NF.

If authentication is successful, the step E34 is followed by a step E36 in which the second subsystem 30 sends the detailed data DD_A associated with the invoice number NF in the database 35 to the first subsystem 40.

That detailed data is received during a step F16 of the method of the invention.

It can then be sent to the insured person A for verification.

The invention claimed is:

1. A system for managing patient medical records, comprising:
    a first data processing subsystem including:
        a generating unit configured to generate a common key from data identifying a person; and
        a private database configured to associate said common key with said identification data; and
    a second data processing subsystem including:
        an obtaining unit configured to obtain said common key;
        a generating unit configured to generate a random number from said common key;
        a receiving unit configured to receive a registration message for a medical service including at least sensitive medical personal data of said person and said random number from outside said second data processing subsystem; and
        a storing unit configured to store said sensitive medical personal data in a second database in association with said random number and said common key, wherein the association between said common key and said identification data is unknown from the second data processing subsystem and the association between the common key and the random number is unknown from the first data processing subsystem, wherein the second data processing subsystem is configured to perform a calculation based at least in part on the sensitive medical personal data of the registration message and send a result of the calculation to the first data processing subsystem, and the first data processing subsystem is configured to supply said person with said result of the calculation,
    wherein the result of the calculation is a reimbursement amount for the medical service.

2. The system according to claim 1, wherein the second data processing subsystem includes:
    an obtaining unit configured to obtain reduced data from the sensitive medical personal data; and
    a sending unit configured to send said first data processing subsystem a message including said reduced data and the common key associated with said sensitive medical personal data in the storing unit.

3. The system according to claim 1, wherein the second data processing subsystem includes a statistical processing unit configured to statistically process said sensitive medical personal data stored in the storing unit.

4. The system according to claim 1, wherein the second data processing subsystem includes a creation unit configured to create a private encryption/public encryption key pair;
    wherein in the system said person uses a personal digital storage medium to calculate encrypted data from said sensitive medical personal data, said random number and said public encryption key, said encrypted data being sent to said second data processing subsystem via a reader of the medium, the second data processing subsystem including:
        a receiving unit configured to receive said encrypted data from said reader; and
        a decrypting unit configured to decrypt said encrypted data using said private encryption key and obtaining said random number and said sensitive medical personal data in order to store them in said storing unit.

5. The system according to claim 4, wherein said medium is configured to obtain said sensitive medical personal data from said reader.

6. The system according to claim 1, wherein said first data processing subsystem includes:
- a receiving unit configured to receive from a requestor a request for obtaining particular sensitive medical personal data of said person; and
- a sending unit configured to send the second data processing subsystem a request for authentication of said requestor, said authentication request including an identifier of said particular sensitive medical personal data and the common key generated from data identifying said person; and said second processing subsystem includes:
- a receiving unit configured to receive said authentication request;
- an authentication unit configured to authenticate said requestor; and
- a sending unit configured to send said particular sensitive medical personal data to said first data processing subsystem if said authentication is successful.

7. The system according to claim 1, wherein said sensitive medical personal data consists of:
- detailed medical data relating to a medical service provided for a patient and associated with reduced medical data; and
- complementary information including an amount charged for said service.

8. The system according to claim 7, wherein the storing unit stores information representing entitlements of a patient in association with said common key generated for the patient; and wherein the second data processing subsystem includes:
- a calculation unit configured to calculate a reimbursement amount from the entitlements of the patient and the amount charged for the service received in the form of encrypted data from the reader of a healthcare professional adapted to read the personal digital storage medium of said patient; and
- a sending unit configured to send said reimbursement amount to said reader or to the first data processing subsystem.

9. A method of managing patient medical records, comprising:
- generating a common key in a first data processing subsystem from data identifying a person, wherein said common key is associated with said identification data, and wherein the common key is obtained by a second data processing subsystem;
- generating in the second data processing subsystem a random number from said common key;
- receiving in the second data processing subsystem a registration message for a medical service including sensitive medical personal data of said person and said random number from outside said second data processing subsystem; and
- storing said sensitive medical personal data in a database of said second data processing subsystem in association with said random number and said common key, wherein the association between said common key and said identification data is unknown from the second data processing subsystem and the association between the common key and the random number is unknown from the first data processing subsystem, wherein the second data processing subsystem performs a calculation based at least in part on the sensitive medical personal data of the registration message and sends a result of the calculation to the first data processing subsystem, and the first data processing subsystem supplies said person with said result of the calculation, wherein the result of the calculation is a reimbursement amount for the medical service.

10. The method according to claim 9, comprising:
- obtaining in the second data processing subsystem reduced data from said sensitive medical personal data; and
- sending the first data processing subsystem a message including said reduced data and the common key associated with said sensitive medical personal data in the second database.

11. The method according to claim 9, further comprising:
- receiving in the second data processing subsystem encrypted data calculated from sensitive medical personal data, a random number and a public encryption key; and
- decrypting in the second data processing subsystem said encrypted data using a private encryption key associated with said public key to obtain said random number and said sensitive medical personal data in order to store them in said second data base.

12. The method according to claim 9, wherein said sensitive medical personal data consists of:
- detailed medical data relating to a medical service provided for a patient, that detailed medical data being associated with reduced medical data; and
- complementary data including an amount charged for said service; and wherein the second database stores in association with said common key generated for a patient information representing entitlements of the patient, wherein the method comprises:
- calculating in the second data processing subsystem a reimbursement amount from the entitlements of the patient and the amount charged for the service received in the form of encrypted data from a reader of a personal digital storage medium of said patient; and
- sending said reimbursement amount to said reader or to the first data processing subsystem.

13. The method according to claim 9, comprising:
- receiving in the first data processing subsystem a request from a requestor for obtaining particular personal sensitive medical data of said person;
- receiving in the second data processing subsystem from said first data processing subsystem an authentication request including an identifier of said particular sensitive medical personal data and a common key generated from data identifying said person;
- authenticating said requestor; and
- sending said particular sensitive medical personal data to said first data processing subsystem if said authentication is successful.

14. A non-transitory computer readable medium comprising a computer program, the computer program including instructions for managing patient medical records which when executed by a second data processing subsystem perform a method comprising:
- generating a common key in a first data processing subsystem from data identifying a person, wherein said common key is associated with said identification data, and wherein the common key is obtained by a second data processing subsystem;
- generating in the second data processing subsystem a random number from said common key;

receiving in the second data processing subsystem a registration message for a medical service including sensitive medical personal data of said person and said random number from outside said second data processing subsystem; and storing said sensitive medical personal data in a database of said second data processing subsystem in association with said random number and said common key, wherein the association between said common key and said identification data is unknown from the second data processing subsystem and the association between the common key and the random number is unknown from the first data processing subsystem, wherein the second data processing subsystem performs a calculation based at least in part on the sensitive medical personal data of the registration message and sends a result of the calculation to the first data processing subsystem, and the first data processing subsystem supplies said person with said result of the calculation, wherein the result of the calculation is a reimbursement amount for the medical service.

15. A system according to claim 1, wherein the result of the calculation is non-confidential information.

16. A system for managing sensitive personal data, comprising:
- a first data processing subsystem including:
  - a generating unit configured to generate a common key from data identifying a person; and
  - a private database configured to associate said common key with said identification data; and
- a second data processing subsystem including:
  - an obtaining unit configured to obtain said common key;
  - a generating unit configured to generate a random number from said common key;
  - a receiving unit configured to receive a registration message including at least sensitive personal data of said person and said random number from outside said second data processing subsystem; and
  - a storing unit configured to store said sensitive personal data in a second database in association with said random number and said common key,
- wherein the association between said common key and said identification data is unknown from the second data processing subsystem and the association between the common key and the random number is unknown from the first data processing subsystem,
- wherein the second data processing subsystem includes a statistical processing unit configured to statistically process said sensitive personal data stored in the storing unit, and
- wherein the second data processing subsystem is configured to obtain reduced data from said sensitive personal data and send the first data processing subsystem a message including said reduced data and the common key associated with said sensitive personal data in the second database.

17. A system for managing sensitive personal data, comprising:
- a first data processing subsystem including:
  - a generating unit configured to generate a common key from data identifying a person; and
  - a private database configured to associate said common key with said identification data; and
- a second data processing subsystem including:
  - an obtaining unit configured to obtain said common key;
  - a generating unit configured to generate a random number from said common key;
  - a receiving unit configured to receive a registration message including at least sensitive personal data of said person and said random number from outside said second data processing subsystem; and
  - a storing unit configured to store said sensitive personal data in a second database in association with said random number and said common key,
- wherein the association between said common key and said identification data is unknown from the second data processing subsystem and the association between the common key and the random number is unknown from the first data processing subsystem,
- wherein the second data processing subsystem is configured to perform a calculation from the registration message and send a result of the calculation to the first data processing subsystem, and the first data processing subsystem is configured to supply said person with said result of the calculation, and
- wherein the second data processing subsystem includes a statistical processing unit configured to statistically process said sensitive personal data stored in the storing unit.

* * * * *